March 5, 1968 L. F. BAYER ETAL 3,371,960
VEHICULAR SAFETY HARNESS APPARATUS
Filed April 18, 1966 5 Sheets-Sheet 1

INVENTORS:
LEON F. BAYER AND
BY JACK L. BAYER.
ATTORNEY

United States Patent Office 3,371,960
Patented Mar. 5, 1968

3,371,960
VEHICULAR SAFETY HARNESS APPARATUS
Leon F. Bayer, 1640 E. Bethany Home Road, Phoenix, Ariz. 85016, and Jack L. Bayer, 9021 N. 18 Drive, Phoenix, Ariz. 85020
Continuation-in-part of application Ser. No. 343,391, Feb. 7, 1964. This application Apr. 18, 1966, Ser. No. 552,661
10 Claims. (Cl. 297—386)

ABSTRACT OF THE DISCLOSURE

This invention is concerned with safety harness apparatus for use in vehicles, such as motor cars or aircraft. The safety apparatus is of the hydraulic type, and is constructed to permit free normal movements of the operator. However, any sudden forward movement of the operator causes the apparatus to lock and to hold him firm. Added features of the invention include a means for reducing excessive stress on the operator in the event he is thrown forward with a high rate of speed, such as upon impact with another vehicle. Also, an added feature is the provision of means for adapting the apparatus to be used in conjunction with seat ejection mechanisms in aircraft, and to provide means for drawing the pilot firmly back against the seat, when such ejection is effectuated.

---

This application is a continuation-in-part of copending application Ser. No. 343,391, which was filed Feb. 7, 1964, in the names of the present inventors.

The present invention relates to vehicular safety harness apparatus, and particularly to an hydraulic mechanism for controlling a chest and shoulder safety harness for use in any fast moving vehicle.

The apparatus of the invention serves to absorb the kinetic energy expended by the upper body or torso of the pilot, driver, or passenger of the vehicle, in direct proportion to the energy created by a crash or sudden deceleration of the vehicle.

The safety harness apparatus of the invention also serves, in one of its embodiments, firmly to support the pilot on the seat of the vehicle, during an emergency ejection operation.

The safety harness apparatus of the present invention may be used in conjunction with a conventional lap type safety seat belt, for example, the purpose, function, advantages and disadvantages of which belts are well known; especially the particular disadvantage in that the energy absorption function is limited to the lower portion of the vehicle occupant's body, thus allowing the upper part of the body and head to snap forward in the event of a crash or sudden deceleration of the vehicle, with the possibility of the occupant incurring severe injury to the upper body.

An object of the present invention is to provide a chest and shoulder safety harness apparatus for installation in vehicles, which harness apparatus is adapted to be used alone, or associated with, and supplemental to, a conventional lap type seat belt, for the purpose of restraining and limiting movement of the upper body portion of a vehicle occupant in direct proportion to the conditioning requirements necessary.

A further object of the invention is to provide such safety apparatus which may be used, for example, to protect a pilot in an aircraft; and which has further capability of drawing the pilot firmly back against the seat and locking him in that position in the seat, in the case of an emergency seat ejection by the pilot from the aircraft.

Another object of the invention is to provide an improved chest and shoulder harness safety apparatus which is adapted to be secured to the roof structure of a vehicle, for example, above and to the rear of the wearer occupant; and which has a retractable harness strap element, which extends downwardly and forwardly over the shoulder and diagonally over the chest of the wearer, to a point of attachment to a conventional seat belt, or other fixed point, in such a manner and relation that it remains reasonably taut over the upper torso of the wearer at all times, thereby eliminating the possibility of excessive, injurious pressure being applied to the upper body by the harness itself, in the event of a severe crash.

A still further object of the invention is to provide such improved safety harness apparatus which can conveniently be mounted on the rear of the chair supporting the occupant wearer.

Yet a further object of the invention is to provide such improved safety harness apparatus which is completely automatic in its function, which requires no adjustments or other conscious act on the part of the wearer to make it fully effective upon sudden deceleration of the vehicle, and which can be worn continuously during operation of the vehicle with a minimum of discomfort to the wearer.

Other objects and advantages of the invention will be more clearly understood by reference to the following specification, together with the accompanying drawings, in which:

Referring to the drawings for more specific details of the invention and especially to FIGURES 1, 2, 3 and 3a which illustrate the installation and location of the first embodiment of the harness safety apparatus of the invention with respect to the occupant wearer seated in a motor vehicle; 10 represents generally the body of a motor vehicle which comprises a hood 11, a roof 12, a floor 13 and a dashboard 14 which encloses the interior passenger compartment 15 which contains the conventional seats 16, instrument panel 17, steering wheel 18, controls 19, and is provided with the usual windshield 20 and windows 21.

Figure 1:
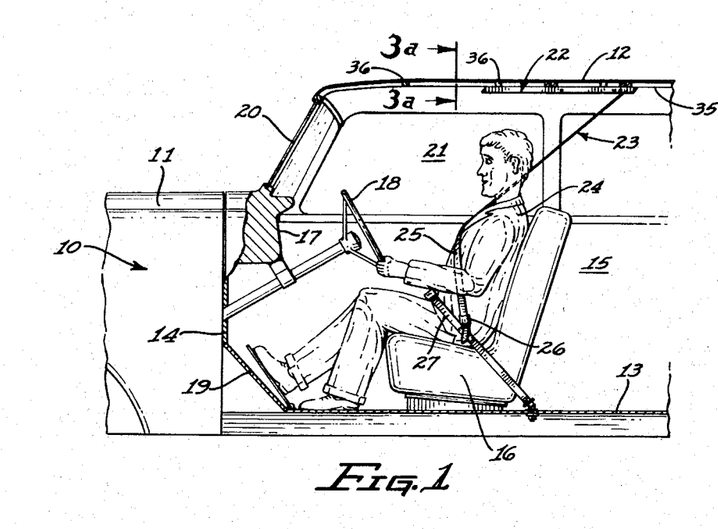
FIGURE 1 is a left side elevational view of a motor vehicle with parts in section and broken away to illustrate the safety harness apparatus of one embodiment of the present invention, as worn by the operator of the vehicle.
Figure 2:
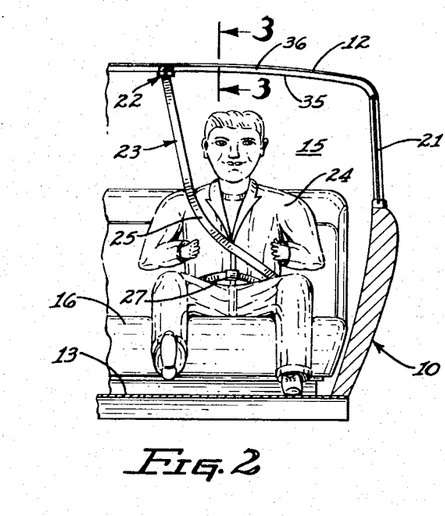
FIGURE 2 is a front fragmentary elevational view of the safety harness apparatus of FIGURE 1, as worn by the operator.

It will be understood, of course, that although the safety harness apparatus of the first embodiment of the invention is illustrated in FIGURES 1 and 2 as installed in a passenger motor vehicle, the safety harness apparatus may also be used in other vehicles, such as aircraft. In fact, the second embodiment of the invention, to be described, although it too may be used in passenger motor vehicles, has special applications to aircraft, and especially to the type in which seat ejection is used in emergencies.

The safety harness apparatus of the first embodiment comprises an automatic control unit 22 and a harness or strap 23 which are associated in a specific manner to perform the functions of the invention with respect to the occupant wearer 24 of the harness 23 as will be later described.

The control unit 22 in the embodiment of FIGURES 1-10 is preferably attached to the vehicle roof above the harness wearer's head and slightly to the right of the wearer's body center line when the wearer of the harness is seated on the left side of the vehicle as the driver of the vehicle normally would be, and slightly to the left of the body center line when the wearer of the harness is seated on the right side of the vehicle as a passenger normally would be.

The control unit 22 is located to project rearwardly from a point above the wearer's head a sufficient distance to allow the harness 23, which includes a strong flat nylon webbing or strap 25, to depend downwardly, forwardly and inwardly at a comfortable angle over the wearer's shoulder, and diagonally over the wearer's chest to a point of attached 26 on a conventional lap type seat belt 27, at the wearer's side.

Although the harness of the first embodiment is shown in FIGURES 1 and 2 as having the strap 25 attached to a seat belt, it is to be understood that under certain conditions, the strap may be secured directly to a rigid part of the seat.

Figures 3, 3A:
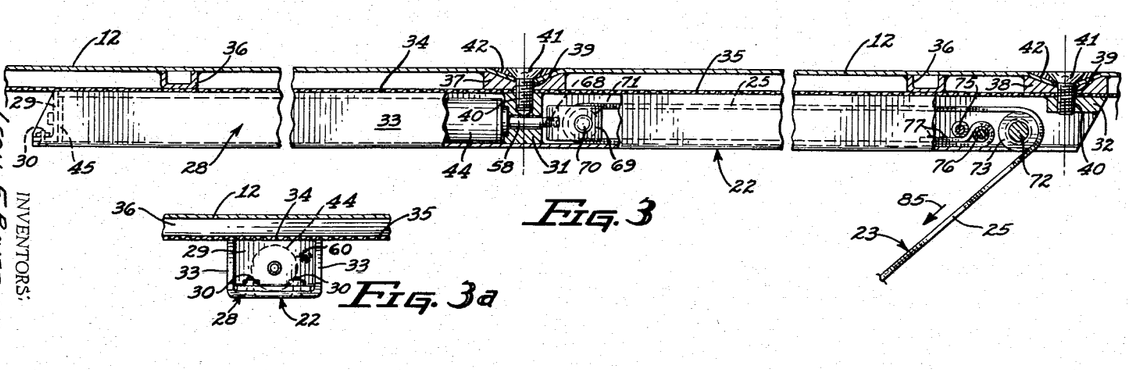
FIGURE 3 is an enlarged fragmentary sectional view of a control unit of the safety harness apparatus of FIGURES 1 and 2; illustrating certain of the internal operating components of the control unit, and the manner in which it may be secured to the roof structure of the motor vehicle.
FIGURE 3A is an enlarged fragmentary transverse section of the control unit, taken substantially along the line 3A—3A of FIGURE 1, and showing the configuration of the forward end of the control unit.
Figures 4, 5, 9, 10:
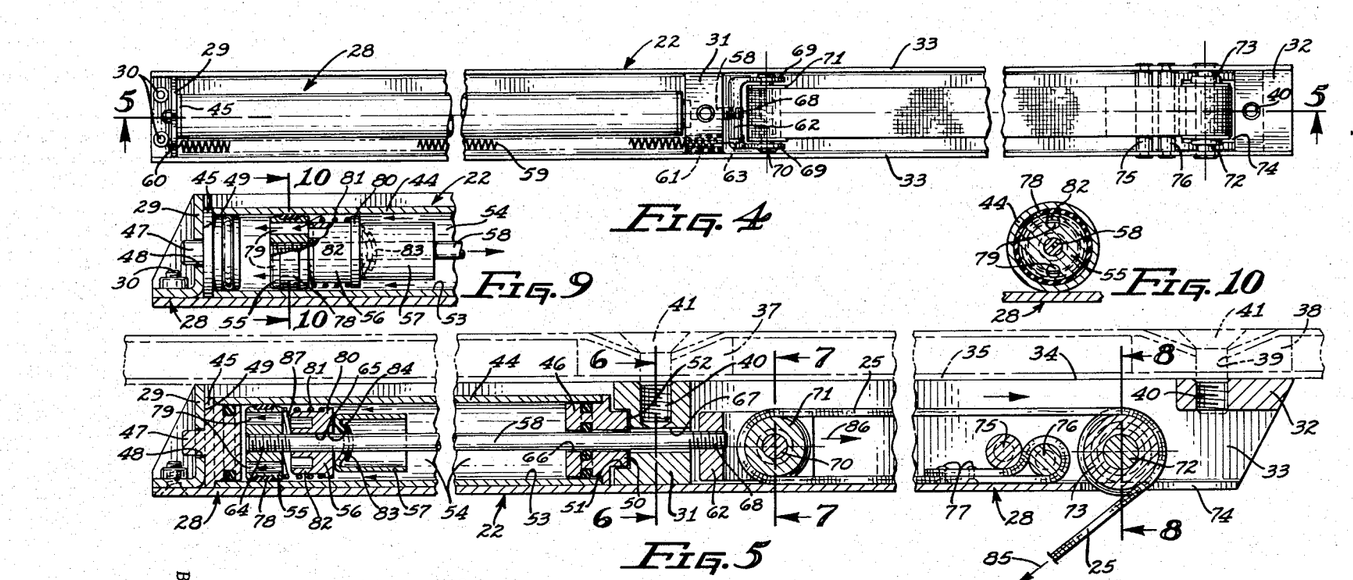
FIGURE 4 is an enlarged plan view of the control unit.
FIGURE 5 is an enlarged vertical sectional view of the control unit, with its various parts in an "at rest" position, taken substantially along the line 5—5 of FIGURE 4; and also showing the vehicle roof, head-lining, and attaching means in phantom line.
FIGURE 9 is a fragmentary sectional view of the forward end of the control unit, similar to the view of FIGURE 5, but showing the various parts moved rearwardly or in active relation.
FIGURE 10 is a fragmentary transverse sectional view of the control unit taken substantially along the line 10—10 of FIGURE 9.

The control unit 22 includes a narrow elongated channel or support member 28 (FIGURES 3 and 3A) having an angle piece 29 fitted at the front end and secured to the base of the channel by bolts 30. A mounting rib 31 which may be suitably secured, as by welding, to the sides and base of the channel, is located approximately midway in the channel, and a mounting lug 32 which may be welded or otherwise secured to the channel is located at the extreme end thereof. The side walls, or what may be termed legs 33, of the channel 28 are of equal length and together with the top surface of the angle 29, the top surface of the rib 31 and lug 32, provide a flat horizontal mounting surface 34 which is adapted to fit tightly and flush up against the bottom inside surface of the conventional ceiling or head-lining material 35 (see (FIGURES 3 and 4).

Between the ceiling 35 and the roof 12 are the conventional ceiling or head-lining material 35 (see FIGURES 38, which members have countersunk holes 39 which align with threaded bores 40 in the rib 31 and the lug 32 to receive suitable screws 41 which project through the holes 39 in the center of countersunk or dimpled indentations 42 of the roof 12, to securely support the control unit 22 tightly in contact with the roof bow members 36 and the spacer members 37 and 38 in proper relation to the vehicle occupant 24. The heads of the screws 41 are adapted to fit flush or slightly below the top surface of the roof 12, and the resultant countersunk cavity 42 is preferably filled with a suitable material such as lead which may be finished flush with the roof top.

The above described means of attaching the control unit 22 to the vehicle roof structure 12 is a preferred arrangement, but other suitable means may be utilized.

Referring now to FIGURES 4–10 of the drawings, which illustrate in detail the mechanical and hydraulically operating parts which comprise the control unit 22, and the relationship of these parts with the harness 23. The control unit 22, and the relationship of these parts with the harness 23. The control unit 22 includes what may be termed an hydraulic cylinder 44, having a front closure head 45 and a rear closure head 46. These heads are mounted on the respective front and rear ends of the cylinder 44, and they are suitably sealed so as to retain a fluid, such as oil, within the cylinder.

The front closure head 45 is provided with a forwardly projecting pin 47 which extends through a suitable clearance hole 48 in the angle piece 29, allowing the front face of the head 45 to abut against the rear surface 49 of the angle piece 29 and to axially align the cylinder 44 in the channel member 28. The rear closure head 46 is provided with a rearwardly extending cylindrical boss 50 which fits with suitable clearance into a counter bore 51, centrally located in the stationary mounting rib 31, and in alignment with the clearance hole 48 in the angle piece 29. The boss 50 has a flat abutment surface 52 which is adapted to contact the bottom of the counter bore 51 thereby maintaining parallel longitudinal alignment of the cylinder 44 with the side walls or legs 33 and and the base of the channel member 28, thus preventing relative movement of the cylinder 44 between the angle piece 29 and the stationary mounting rib 31.

The hydraulic cylinder 44 has the usual axial bore 53 (FIGURE 5) which together with the inner ends of the front and rear closure heads 45 and 46, form a sealed cylindrical fluid chamber 54 in which a piston 55, a control plug or valve member 56, and a tilt ring 57, which are suitably mounted on a piston rod 58, are adapted to move axially in the chamber 54, as may be caused by a rearward force being exerted on the piston rod 58 by the harness element 23, or a forward force imposed on the piston rod by contraction of a tension spring 59 (see FIGURES 4 and 6) as the relative position of the harness wearer may require.

Figure 6:
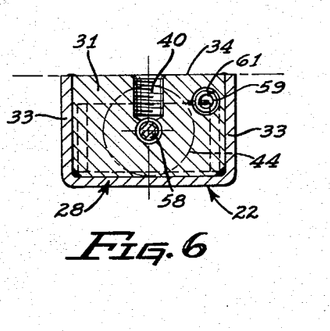
FIGURE 6 is a transverse sectional view of the control unit taken substantially along the line 6—6 of FIGURE 5.
Figure 7:
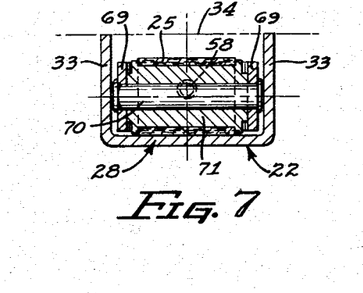
FIGURE 7 is a transverse sectional view of the control unit taken substantially along the line 7—7 of FIGURE 5.
Figure 8:
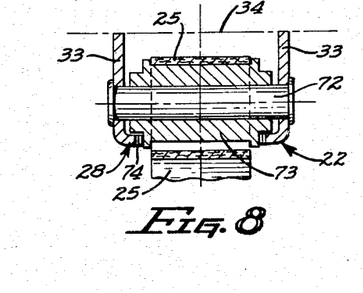
FIGURE 8 is a transverse sectional view of the control unit taken substantially along the line 8—8 of FIGURE 5.

The tension spring 59 is suitably secured to the forward end of the channel member 28 to the upstanding leg of the angle piece 29, as at the point 60 and extends rearwardly parallel to the cylinder 44, as best shown in FIGURE 4, through a bore 61 in the stationary rib 31, where it is secured to a U-shaped fork member 62 as at the connection point 63. The piston rod 58 is connected by means of its threaded forward end 64 to the piston 55 and projects rearwardly through clearance bores 65 in the control plug 56 and in the tilt ring 57, a sealed clearance bore 66 in the rear cylinder head 46, a central bore 67 in the rib 31, and is threaded into the cross bar of the fork member 62 as at 68.

The fork member 62 is provided with rearwardly extending arms 69 which support a bearing shaft 70 and a rotatable spool or roller member 71 therebetween. Another bearing shaft 72 is suitably secured transversely of the channel member 28 of unit 22 at its extreme rear end thereof and is adapted to support a rotatable spool or roller member 73 as shown in FIGURE 5.

The harness element strap 25 extends upwardly and rearwardly over the wearer's shoulder (FIGURES 1 and 2), as previously described, and through a slot 74 in the base of the channel 28, around and over the rear roller 73, forwardly over and under the front spool 71 and rearwardly along the inner surface of the channel base, where it is threaded over and under suitable stationary clamping pins 75 and 76 which are riveted or otherwise secured between the channel legs 33, and again forwardly where the end of the strap 25 is suitably secured by rivets or other suitable means to its under portion as at 77.

The piston 55 is provided with a suitable rubber or "neoprene" or "Teflon" sealing ring 78 which contacts the bore 53 of the hydraulic cylinder 44 in sliding relation to prevent passage of fluid from one side of the piston to the other side in the usual manner. A pair of ports 79 (FIGURE 10) extend from the front face of the piston through the piston to the rear face thereof to provide for the passage of fluid from the rear portion of the chamber 54 to the front portion of the chamber, as required when the piston moves to displace fluid on either side thereof.

Control plug 56 is adapted to slide easily on the piston rod 58 and is provided with a rear circular flange 80 against which a compression spring 81 is adapted to seat, for the purpose of normally maintaining an area of separation 87, between the rear face of the piston 55, upon which the spring 81 also bears, and the front face of control plug 56, for reasons which will be more fully explained in the function of the device. The control plug 56 is also provided with a thin diametrical wall 82 which is adapted to collapse radially inwardly when extreme pressures are applied to its circumferential surface.

The tilt ring 57, mounted on the piston rod 58 and to the rear of the control plug 56, is prevented from rearward movement by a stop washer 83, which is secured to the piston rod. The stop washer 83 is preferably arcuate in shape to allow the concave shaped depressed portion 84 of the tilt ring to bear on the convex surface thereof, providing a universal joint to allow the tilt ring 57 to rock laterally thereby causing a forward pressure to be exerted on the rear face of the control plug 56 with which it is associated, under certain conditions, as will be explained, in the explanation of the operational and functional features of the safety harness apparatus, which follows:

The safety harness apparatus of the invention, like all others of a similar nature, is intended to be worn at all times when the passenger or pilot or driver wearer is seated in a moving vehicle, therefore the functioning of the various related parts of the embodiment shown in FIGURES 1–10 will be described under driving conditions.

Should the occupant wearer of the harness move his upper body forward slowly and deliberately such as when reaching to adjust an instrument, or any other normal movement, the harness strap 25 will move downwardly in the direction of the arrow 85, freely rotating over the spools 73 and 71, causing rearward movement of the forward spool 71 and the fork member 62 in the direction of arrow 86 pulling the connected piston rod 58, piston 55 and associated parts, in the same direction. This rearward movement is resisted only by the slight tension of the spring 59 and the slight pressure created by the free passage of hydraulic fluid past the control member 56, the area or space 87, and through the ports 79, to the front of the fluid chamber 54. It can be readily understood that the restraining force applied to the wearer 24 under these circumstances would be quite negligible and present no uncomfortable conditions.

Sudden deceleration of the vehicle, such as by application of the brakes at high speeds, will impel the body of the wearer occupant forward and require greater restraining force to be exerted by the harness apparatus than that required by normal wearer movements just described. This additional restraining force is obtained by utilizing the kinetic energy of the control plug 56 to cause it to move forward against the compression of the spring 81 to the adjacent face of the piston 55 and to move rearwardly in unison therewith, thereby partially blocking the ports 79, as shown in FIGURES 9 and 10, to slow up the transfer of fluid from the rear of the chamber 54 to the front of the chamber and causing greater restraining and retarding forces to be applied to the wearer occupant. This same blocking of the ports occurs when there is rapid movement of the occupant in the seat, which causes rapid unreeling of the harness. The rapid flow of oil through the ports produces a pressure drop while bringing the control plug and piston 55 together. Acceleration of the webbing also closes the ports because the plug 56 tends to remain stationary while the piston 55 is brought towards it.

Should the deceleration of the vehicle be of great intensity, such as might be encountered in a head-on crash at high speed, or any similar condition which might endanger the wearer occupant by the sudden great restraining force applied to the wearer by the harness 23 itself, provision has been made in the present device to control this factor. This is attained by decreasing the restraining force to some degree by suitable means inherent in the control plug 56. To this end, the flexible diametrical wall 82 of the plug 56 is adapted to collapse radially inwardly when severe pressures are exerted on its outer circumference, thereby increasing the size of the opening into the ports 79 in the piston 55 and allowing faster passage of fluid through the piston to the front of the chamber 54, thereby momentarily lessening the restraining force exerted on the wearer by the harness apparatus so as to prevent injury to his person.

Under extremely severe forces, it is possible that the stress exerted on the harness might be great enough to fracture the relatively slender piston rod 58, thus causing the harness to lose the holding back efficacy of the piston 56. To cope with this contingency the roller shaft 70 and bight portion of the fork 62 are designated to bend under such great stress. Bending of the shaft 70 tends to bind pulley or roller 71 thus impeding it from turning and inward bending of the bight portion of the fork 62 tends to squeeze the ends of the pulley 71 between the side arms of the fork 69. At the other roller or pulley 73, the shaft 72 is also made bendable under severe stress to produce the same type of braking action. In addition, the material and thickness of the walls 33 is made such that they will give way allowing the shaft 72 to be pulled through the walls toward the shaft 70. This then brings the roller 73 against the clamping pin 75 and the webbing wrapped there around, and produces additional braking action. In this manner, the tension on the piston rod 58 is somewhat relieved and even if the rod should fracture, there will still be a braking action on the webbing 25 by virtue of the collapsing of the parts as described above.

The control unit 22 is also provided with means to protect the wearer occupant in case of a side or angular force directed against the vehicle. Such applied force would cause the tilt ring 57 to be rocked or tilted relative to the axis of the piston rod 58 and to apply forward pressure to the control plug 56, to hold the control plug against the pressure of the spring 81 into contact with the rear face of the piston 55, partially closing the ports 79 in the piston and thereby slowing the passage of fluid therethrough and assisting its associated elements in applying the necessary restraining forces on the harness wearer's person.

Although as shown, and described, the control unit of FIGURES 1–10 is secured to the ceiling of the vehicle, it is obvious that, if desired, the control unit may be secured to any other suitable part of the vehicle, as, for example, to the rear side of the seat, door post, or other fixed part, in which case the strap may be disposed diagonally across the body of the occupant and attached to the seat belt, or other securing point. For harnessing a baby in the back seat of an automobile, the unit may be mounted to the back of the rear seat.

Figure 11:
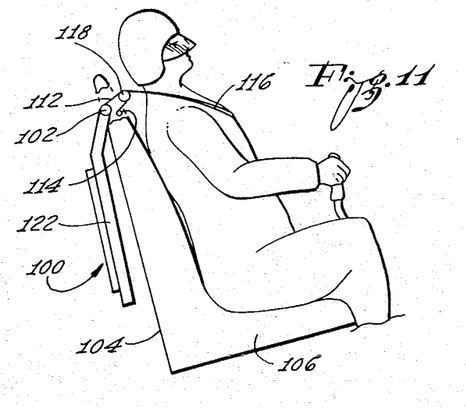
FIGURE 11 is a side elevational view of a second embodiment of the invention, illustrated as mounted on the seat of a vehicle, such as an aircraft.

The embodiment in FIGURES 11–15 is attached to the rear of the seat, as shown in FIGURE 11. As mentioned above, the latter embodiment of the safety harness apparatus, although having general application, is particularly adapted for use in aircraft, and in conjunction with ejection type seat mechanisms.

The safety harness apparatus, as shown in the embodiment of FIGURES 11–15 includes a control unit 100 (FIGURE 11) having a reel 102 rotatably mounted at its upper end. The unit 100 is mounted on the back 104 of a seat 106. The reel 102 is partially housed in a slot in the back 104 of the seat 106, and is held in place by a pair of mounting brackets 108 (FIGURE 14) in which the reel 102 is rotatably mounted.

An elongated strap, or webbing, 112 is wound on the reel 102, and the reel serves as a take-up roller for the webbing. The free end of the webbing 112 is fastened to the seat 106 by an appropriate fastening means 114.

The harness 116 passes diagonally across the upper torso of the wearer, as in the previous embodiment, and a roller 118 is mounted at the end of the harness. The webbing 112 passes around the roller so that when the webbing is wound up on the reel, or take-up roller, 102, it draws the roller 118 backwardly against the seat back 104, and this draws the harness and the occupant back against the back of the seat.

The control unit 100 includes a tubular casing 122 which is bolted to one of the brackets 108 at the side of the back of the seat. The shaft 124, as shown, extends through the mounting brackets 108, and the take-up roller, or reel 102 is rotatably supported thereon. A further tubular shaft 126 is rotatably mounted in the bracket 108, and the reel 102 is keyed to the shaft 126. A sprocket 128 is also keyed to the tubular shaft 126, the sprocket being located within the casing 122.

The chain 130 extends over the sprocket 128 and down in the casing 122. The chain extends over a pair of bushings 132 which are rotatably mounted, for example, on needle bearings.

Figure 12:
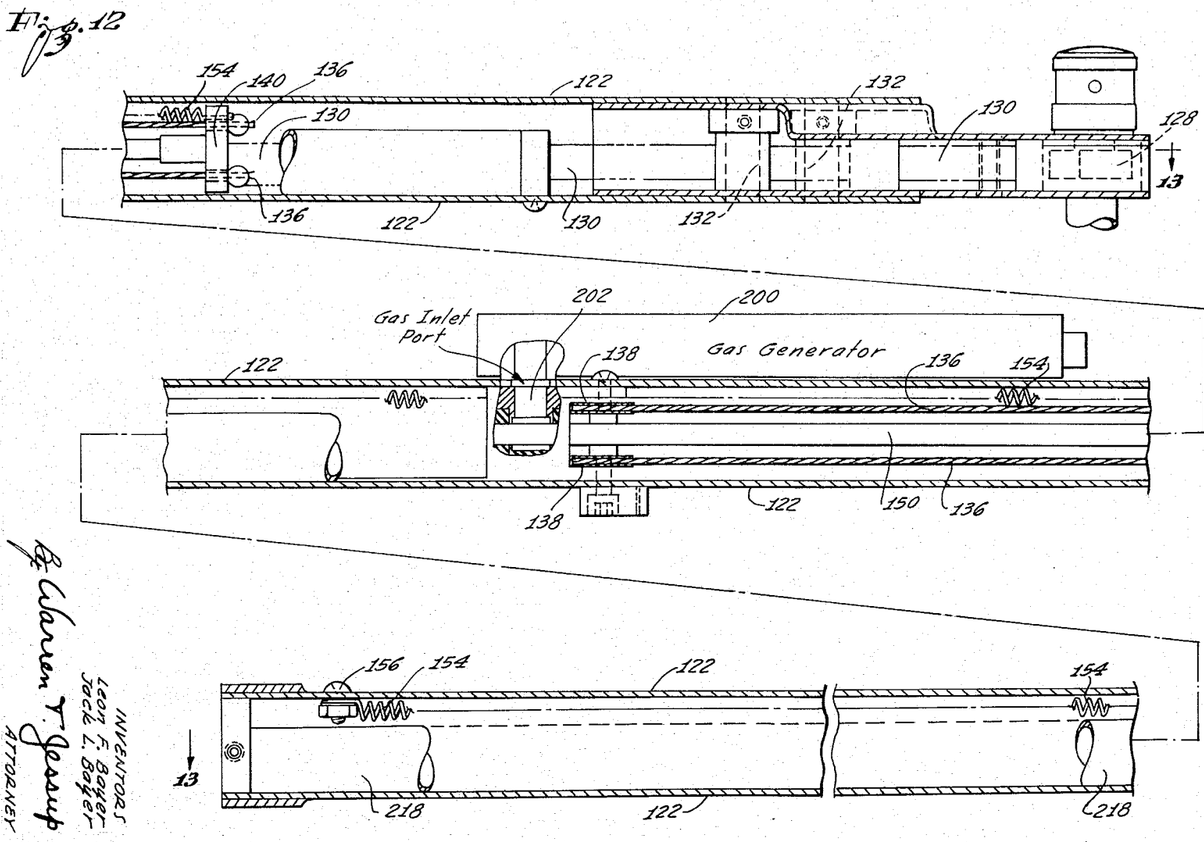
FIGURE 12 is a side sectional view of the control unit of the second embodiment, on an enlarged scale with respect to FIGURE 11.
Figure 13:
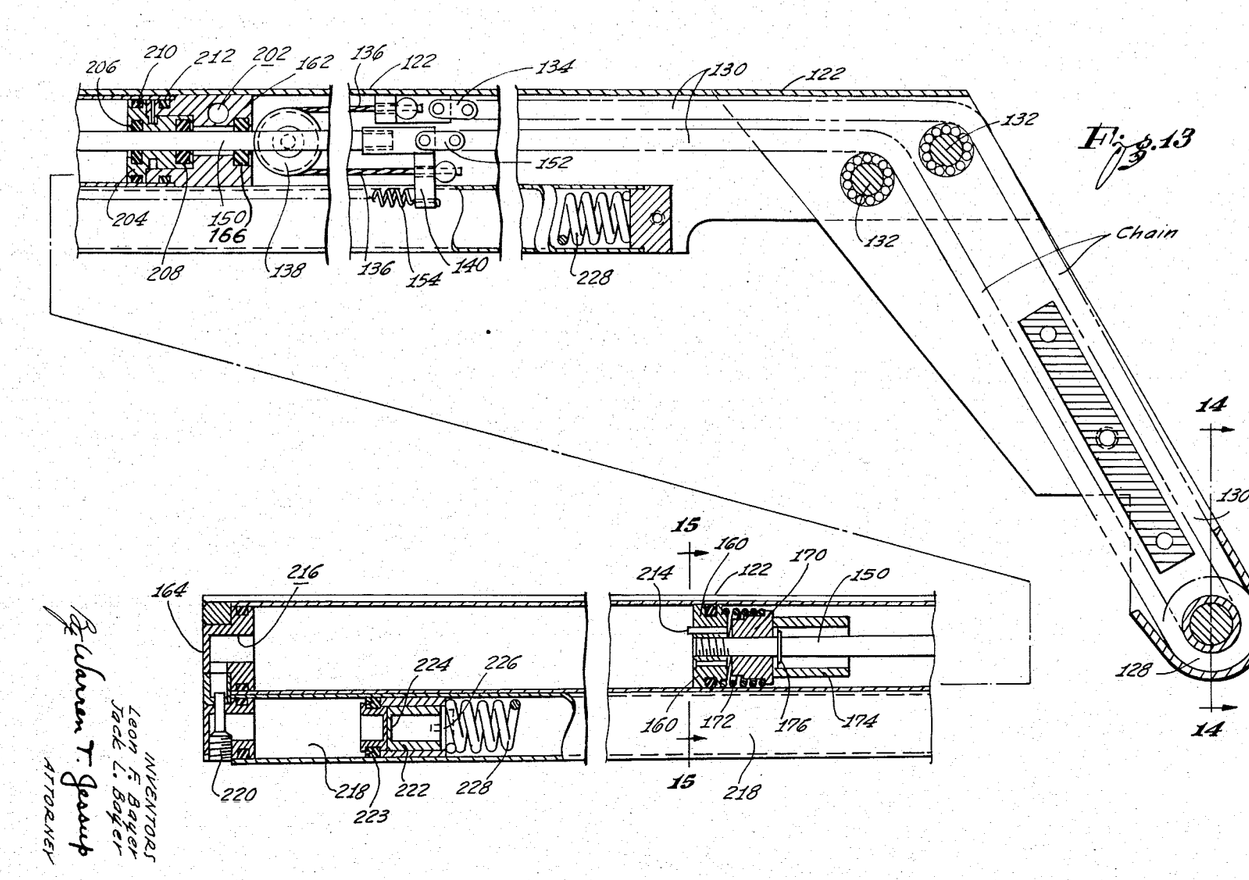
FIGURE 13 is a sectional view of the control unit of the second embodiment, taken substantially along the line 13—13 of FIGURE 12.
Figure 14:
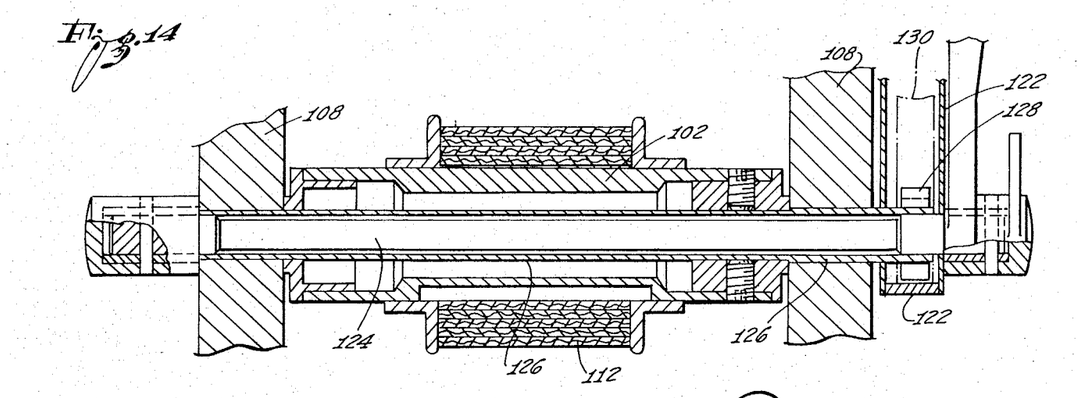
FIGURE 14 is a transverse sectional view of the control unit of the second embodiment taken along the line 14—14 of FIGURE 13.
Figure 15:
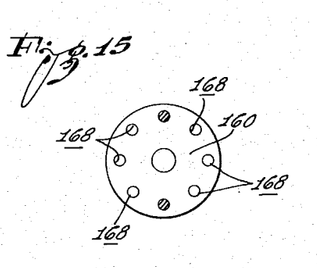
FIGURE 15 is a cross-sectional view of the forward end of the control unit of FIGURE 13, taken essentially along the line 15—15 of FIGURE 13.

One end of the chain 130 is coupled by means of an appropriate coupling 134 to a cable 136, as shown in FIGURE 13. The cable 136 passes around a roller 138, which is rotatably mounted in the tubular casing 122, and the cable is secured to a movable cross arm 140. As shown in FIGURE 12, the chain 130 is actually attached to two cables 136 which extend over a pair of rollers 138, and back to be secured to the cross arm 140. A piston rod 150 extends along the casing 122, as shown in FIGURES 12 and 13. The cross arm 140 is secured to one end of the piston. As shown in FIGURE 13, a connector 152 couples the other end of the chain 130 to the cross arm 140.

A spring 154 is connected to the cross arm 140 and extends to the left hand end of the tubular housing 122 to which it is attached by means, for example, of a bolt 156. It will be appreciated that the spring 154 tends to bias the cross arm 140 and piston rod 150 to the left in the housing 122. When the wearer moves forward in his seat (FIGURE 11), the webbing 112 is caused to unroll from the take-up roller 102, and this causes the chain 130 to move in a direction such that the cross-arm 140 is pulled to the right in FIGURES 12 and 13 against the tension of the spring 154. The tension of the spring 154 is such that the wearer can move relatively freely in a forward direction, when there is only the spring tension to oppose that movement. Then, when the wearer moves back against the back of the seat, the spring 154 moves the cross arm 140 to the left in FIGURES 12 and 13, causing the cables 136 to pull the chain 130 so as to rotate the sprocket 128 and turn the take-up roller 102 in a direction such that the webbing 112 is reeled up on the roller.

A piston 160 is mounted on the left-hand end of the piston rod 150, as shown in FIGURE 13. The left-hand end of the tubular casing 122, in which the piston 160 is disposed, defines a cylinder. As in the previous embodiment, one end of the cylinder is closed by a cylinder head 162, and the other end is enclosed by an end cap assembly 164. The piston rod 150 extends through the cylinder head 162, and is appropriately sealed thereto by means, for example, of a seal 166.

The cylinder portion of the casing 122 is filled with an appropriate fluid, such as oil, and, as in the previous embodiment, ports, or apertures 168 are provided in the piston, so as to allow the passage of oil back and forth through the piston, as the rod 150 moves to the left or right during normal operation of the apparatus.

As in the previous embodiment, a plug 170 is mounted on the piston rod 150; and a spring 172, which is interposed between the plug 170 and the piston 160, and which bears against peripheral flanges on both elements, normally biases the plug 170 away from the rear face of the piston 160. A tilt plug 174 is also provided on the piston rod 150, as in the previous embodiment, and separation of the tilt plug from the plug 170 along the piston rod is prevented by means of a retainer 176.

Therefore, rapid movement of the piston rod 150 to the right in FIGURE 13 above a predetermined minimum velocity causes the plug 170 to move toward the adjacent face of the piston 160, against the pressure of spring 172. This, as before, causes the ports 168 to close fully or partially, so that movement of the piston is stopped or impeded. Again, as soon as the decelerating force on the harness is removed, the spring 172 displaces the plug away from the ports 168, so that normal operation may be resumed.

The pilot may remain in his locked position voluntarily or involuntarily by leaning forward in the harness and, as long as this force remains, the plug 170 is unable to remove itself from the adjacent face of the piston 160, so that the ports 168 remain in their closed, or partially closed condition. Only when the force on the harness is relieved, can the spring 172 displace the plug 170 away from the rear face of the piston 160 so that normal operation may be resumed.

In the event of side acceleration of the vehicle, the tilt plug 174 will be tilted with respect to the retainer 176, and this tilting action causes the tilt plug to displace the plug 170 against the rear face of the piston 160, so as to bring about the same locking action, as described above.

As mentioned previously, the safety harness apparatus of FIGURES 11–15 may be used in conjunction with an aircraft seat assembly which is ejected, together with the occupier, during an emergency. When such ejection occurs, it is important that the apparatus function so that the occupier of the seat is drawn firmly back against the back of the seat. This is accomplished in the following manner:

A cartridge 200 is provided (FIGURE 12) which is mounted on one side of the casing 122. This cartridge is fired automatically by any appropriate mechanism (not shown) when the seat ejector mechanism is operated. The firing of the cartridge 200 causes pressurized gas to enter the cylinder portion of the casing 122 through an inlet port 202. The introduction of such a gas causes a piston 204 to move along the piston rod 150 from the right to the left within the cylinder portion of the housing (FIGURE 13). The piston 204 is sealed with respect to the piston rod, and with respect to the casing 122, by appropriate seals 206, 208 and 210. The piston 204 is normally held in its inoperative position by means of a shear pin 212 (FIGURE 13). However, when the gas is introduced through the inlet port 202, the piston shears the pin 212 as it is moved to the left in the cylinder portion of the housing.

As the piston 204 moves to the left in the casing 122, it moves the oil trapped in the right hand portion of the cylinder against the plug 170 and forces the plug firmly against the inner face of the piston 160, so as to close the ports 168. This action causes the piston to move to the left in FIGURE 13 to its extreme left hand position, and this action firmly draws the pilot, or other occupier of the seat 106, back firmly against the back of the seat, so that he is securely held and locked against the seat during the ejection operation.

The piston 160 is so moved to the left, until a pair of stand-off pins, such as the pin 214 engage the inner face of the end cap assembly 164. This allows oil to continue to escape from the chamber and prevents gas pressure from becoming excessive. An escape port 216 is provided in the end cap assembly, and this port extends through the end cap assembly into an auxiliary cylinder 218. The auxiliary cylinder 218 is supported along the side of the housing 122, as shown, and its left hand end in FIGURE 13 is coupled to the interior of the cylinder portion of the housing 122 through the port 216 in the end cap 164. The rate of passage of oil through the escape port 216 may be controlled, for example, by an adjustable plug 220 which forms a controllable orifice for the passage of oil into the auxiliary cylinder.

A piston 222 is mounted in the auxiliary cylinder 218. An appropriate seal such as an O-ring 223 seals the piston 222 to the wall of the auxiliary cylinder. The piston 222 is actually tubular in form, and is normally closed by a blow-out disc 224. In addition, a pug 226 is mounted at the right hand end of the piston. A spring 228 extends the length of the auxiliary cylinder, and this spring normally biases the piston 222 towards the left hand end of the auxiliary cylinder. As the oil escapes through the port 216, and at a rate determined by the setting of the plug 220, it enters the auxiliary cylinder 218 and forces the piston 222 to the right in FIGURE 13.

This movement of the piston 222 against the spring 228 occurs during normal operation of the safety harness apparatus, and permits a rapid return of the webbing to its reeled condition, when the wearer sits back in his seat; and it also accommodates oil volume changes for changes in temperature. This return is facilitated by the spring 154 drawing the piston rod 150 and piston 160 to the left in FIGURE 13, the oil in the piston in the left hand end of the cylinder passing through the ports 168 in the piston, and also passing through the escape port 216 against the piston 223.

However, during an ejection operation, during which the piston 160 is moved rapidly to its extreme left hand position in FIGURE 13, and during which operation the oil does not pass through the aperture 168 in the piston 160, the oil then forced through the escape port 216 and into the auxiliary cylinder 218 fractures the blow-out disc 224 and flows past the plug 226 into the space normally occupied by the spring 228. Under the latter conditions, the oil flows rapidly from the main cylinder into the auxiliary cylinder, with the rate being controlled only by the adjustment of the plug 220. The adjustment of the plug 220, in its control of the passage of oil from the main cylinder into the auxiliary cylinder, controls the rate at which the occupant is drawn back against the back of the seat during the ejection operation.

While the apparatus herein described and disclosed constitutes preferred forms of the invention, it is to be understood that modifications may be made therein without departing from the spirit and scope of the invention as set forth in the appended claims.

Having thus fully set forth and described this invention, that which is claimed and desired to be obtained by United States Letters Patent is:

1. In a safety harness apparatus for an occupant seated in a vehicle, and which apparatus includes an elongated strap-like member adapted to extend around the torso of the occupant, the combination of: an elongated tubular control unit having a fluid-containing chamber therein; a piston rod slidable in said control unit and extending into said chamber and movable in a first direction with respect to said chamber for forward movements of said occupant; a piston secured to said piston rod to be moved thereby reciprocally in said chamber, said piston having a passage therethrough for the flow of fluid through the passage upon such reciprocal movement of the piston in said chamber; a valve member slidably mounted on said piston rod and movable towards said piston when said piston is moved in said first direction so as to inhibit the flow of fluid through said passage; resilient means interposed between said piston and said valve member normally to bias said valve member into a displaced relationship with respect to said piston; and means coupling said piston rod to said strap-like elongated member so that sudden movement of said occupant relative to said control unit causes said valve member to move toward said piston against the bias of said resilient means due to hydraulic pressure and thereby restrict the flow of fluid through said passage so as to inhibit such forward movement of said occupant.

2. Apparatus as defined in claim 1, comprising:
  a first roller mounted on said piston rod,
  a second roller mounted on said control unit in line with said rod,
  said strap-like member having one end secured to said unit, passing over said first roller, thence over said second roller, and thence being secured to the vehicle adjacent to the occupant.

3. The combination defined in claim 1 and which includes resilient means engaging said piston rod for biasing said piston and piston rod towards one end of said chamber.

4. The combination defined in claim 1 and which includes a tilt member mounted on said piston rod adjacent said valve member, said tilt member being movable angularly with respect to said piston rod to drive said valve member against said piston so as to decrease the flow of fluid through said passage in the presence of side or angular forces directed against the vehicle.

5. The combination defined in claim 1 in which said valve member has a collapsible wall effective to increase the flow of fluid through said passage in the presence of severe decelerations of said vehicle to lessen momentarily the restraining force exerted by the apparatus on the occupant so as to prevent injury to the occupant by the apparatus.

6. The combination defined in claim 1 and which includes a further piston in said chamber slidably mounted on said piston rod, and means for introducing a further fluid into said chamber on the side of said further piston remote from said first mentioned piston, so as to drive said first mentioned piston and piston rod to their extreme positions in said chamber.

7. The combination defined in claim 6 and which includes an auxiliary cylinder, and means defining a passage from said chamber into one end of said auxiliary cylinder to permit fluid from said chamber to flow into said auxiliary cylinder upon the aforesaid drive of said first mentioned piston to its extreme position in said chamber.

8. The combination defined in claim 7 and which includes a third piston slidable in said auxiliary cylinder, and resilient means biasing said third piston towards said one end of said auxiliary cylinder.

9. The combination defined in claim 7 and which includes an adjustable plug disposed in said last named passage to control the rate of flow of fluid through said passage.

10. The combination defined in claim 8 in which said third piston has a passage extending therethrough and a blow-out disc normally closing said last named passage.

References Cited

UNITED STATES PATENTS

| | | | |
|---|---|---|---|
| 1,280,727 | 10/1918 | Hem | 188—96 |
| 1,810,233 | 6/1931 | Walden | 188—96 |
| 2,680,476 | 6/1954 | Saffell | 244—122 X |
| 2,771,128 | 11/1956 | Doolittle | 280—150 |
| 3,146,027 | 8/1964 | Winberg | 297—385 |

MILTON BUCHLER, *Primary Examiner.*

B. BELKIN, *Examiner.*